(12) United States Patent
Ehrsam et al.

(10) Patent No.: US 10,823,188 B2
(45) Date of Patent: Nov. 3, 2020

(54) ELECTRIC CENTRIFUGAL PUMP WITH CONTAINMENT SHELL GROOVES

(71) Applicant: Bühler Motor GmbH, Nuremberg (DE)

(72) Inventors: Jürgen Ehrsam, Fürth (DE); Helmut Kellermann, Langenzenn (DE); Christian Zimmerer, Pottenstein (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 238 days.

(21) Appl. No.: 15/608,189

(22) Filed: May 30, 2017

(65) Prior Publication Data
US 2017/0343006 A1 Nov. 30, 2017

(30) Foreign Application Priority Data
May 30, 2016 (DE) .......................... 10 2016 209 312

(51) Int. Cl.
*F04D 29/22* (2006.01)
*F04D 13/06* (2006.01)
(Continued)

(52) U.S. Cl.
CPC ......... *F04D 29/225* (2013.01); *F04D 13/064* (2013.01); *F04D 13/0613* (2013.01);
(Continued)

(58) Field of Classification Search
None
See application file for complete search history.

(56) References Cited

U.S. PATENT DOCUMENTS 2,925,041 A * 2/1960 Miroslav ............. F04D 15/0094
417/357
3,220,350 A * 11/1965 White ................. F04D 13/0613
415/115
(Continued)

FOREIGN PATENT DOCUMENTS

DE 17 04 792 U 8/1955
DE 10 2009 028 144 A1 2/2011
EP 0846365 B1 * 6/2001 ............. H02K 7/088

OTHER PUBLICATIONS

Office Action dated Mar. 20, 2017, issued in counterpart German Application No. 10 2016 209 312.6. (7 pages).
(Continued)

*Primary Examiner* — Peter J Bertheaud
*Assistant Examiner* — Geoffrey S Lee
(74) *Attorney, Agent, or Firm* — Westerman, Hattori, Daniels & Adrian, LLP

(57) ABSTRACT

An electric centrifugal pump having a motor housing, a pump head, a containment shell, and a rotor assembly consisting of a pump impeller and a permanent magnet rotor, wherein the pump head with the containment shell defines a wet chamber, in which the rotor assembly is arranged rotationally around a longitudinal motor axis, the containment shell with the motor housing defines a dry chamber, in which a wound stator is arranged, and the permanent magnet rotor is arranged within the stator and a hollow-cylindrical region of the containment shell. Particle accumulations in the region between the containment shell and the permanent magnet rotor cannot occur or can only occur to a very minor extent and that the consequences of impurities in the wet chamber are reduced in order to prevent premature wear or a blockage of the centrifugal pump.

20 Claims, 8 Drawing Sheets

(51) Int. Cl.
*F04D 29/70* (2006.01)
*H02K 5/128* (2006.01)
*H02K 1/32* (2006.01)
*F01D 25/24* (2006.01)
*H02K 1/27* (2006.01)
*H02K 5/173* (2006.01)
*H02K 5/167* (2006.01)

(52) U.S. Cl.
CPC ...... *F04D 13/0626* (2013.01); *F04D 29/2211* (2013.01); *F04D 29/2266* (2013.01); *F04D 29/2288* (2013.01); *F04D 29/2294* (2013.01); *F04D 29/708* (2013.01); *H02K 1/2753* (2013.01); *H02K 1/32* (2013.01); *H02K 5/128* (2013.01); *H02K 5/1672* (2013.01); *H02K 5/1732* (2013.01); *F01D 25/24* (2013.01); *F05D 2260/607* (2013.01); *H02K 1/27* (2013.01); *H02K 2201/06* (2013.01); *H02K 2205/03* (2013.01)

(56) References Cited

U.S. PATENT DOCUMENTS

| | | | | |
|---|---|---|---|---|
| 4,396,848 A * | 8/1983 | Scheldorf | ............... | F04B 35/04 29/598 |
| 4,470,752 A * | 9/1984 | Teruo | ............... | F02M 37/04 415/72 |
| 5,333,955 A * | 8/1994 | Papa | ............... | F16C 9/02 123/196 R |
| 6,494,621 B2 | 12/2002 | Markovitch | ............... | F16C 17/026 384/291 |
| 6,960,856 B2 * | 11/2005 | Reinnann | ............... | H02K 5/128 310/156.28 |
| 8,322,929 B2 * | 12/2012 | Issler | ............... | F16C 33/107 384/286 |
| 8,353,687 B2 * | 1/2013 | Werson | ............... | F04D 13/0666 310/156.32 |
| 8,821,023 B2 * | 9/2014 | Bresser | ............... | F16C 33/10 384/288 |
| 8,839,503 B2 * | 9/2014 | Yi | ............... | H02K 1/148 29/596 |
| 9,410,576 B2 * | 8/2016 | Peterson | ............... | F16C 33/043 |
| 9,506,471 B2 * | 11/2016 | Eslinger | ............... | F04D 7/04 |
| 9,614,411 B2 * | 4/2017 | Hozumi | ............... | F04D 29/60 |
| 10,001,139 B2 * | 6/2018 | Zhang | ............... | F04D 29/5813 |
| 2001/0048780 A1 * | 12/2001 | Markovitch | ............... | F16C 17/026 384/291 |
| 2005/0214135 A1 * | 9/2005 | Shibuya | ............... | F04D 29/0465 417/357 |
| 2006/0115190 A1 * | 6/2006 | Chen | ............... | F16C 17/026 384/100 |
| 2008/0199334 A1 * | 8/2008 | Sorensen | ............... | F04B 17/03 417/423.7 |
| 2011/0133580 A1 * | 6/2011 | Sugimoto | ............... | H02K 1/20 310/54 |
| 2013/0129541 A1 * | 5/2013 | Flanary | ............... | A61M 16/1075 417/420 |
| 2013/0223777 A1 * | 8/2013 | Bresser | ............... | F16C 33/10 384/322 |
| 2013/0259720 A1 * | 10/2013 | Mills | ............... | F04D 29/5806 417/410.1 |
| 2017/0058915 A1 * | 3/2017 | Liang | ............... | H02K 5/20 |

OTHER PUBLICATIONS

English translation of Office Action dated Mar. 20, 2017, issued in counterpart German Application No. 10 2016 209 312.6 (12 pages).

* cited by examiner

ELECTRIC CENTRIFUGAL PUMP WITH CONTAINMENT SHELL GROOVES

BACKGROUND OF THE INVENTION

(1) Field of the Invention

The invention relates to electric centrifugal pumps having a structure to remove contaminations in cooling circuits.

(2) Description of Related Art Including Information Disclosed Under 37 CFR 1.97 and 1.98

In combustion engines in the field of motor vehicles, mechanical pumps driven by a crankshaft via a gear belt are generally provided as a main cooling water pump. As a support or an alternative in a turned-off combustion engine, electric centrifugal pumps are used as ancillary cooling water pumps, which generally make use an electronically commutated direct-current motor. Main cooling water pumps can also be run electrically. Cooling water pumps are likewise used in hybrid and electric vehicles, primarily in the cooling circuit of an accumulator cooling system.

Sand grains and other dirt particles are also conveyed in cooling circuits. Particles of quartz sand ($SiO_2$) or metal chips can occur in dimensions of up to 1.6 mm. The impurities can occur during assembly of an engine block for a vehicle, e.g. by residues of molding sand in the production of aluminum die-cast components. The gap between the outer contour of the rotor and the stator or the containment shell is generally significantly below 1 mm. A smaller gap is required for sufficient engine efficiency. Contaminations with particles larger than the gap between the rotor and the stator or the containment shell can result in premature wear or jamming up resulting in blockage of the centrifugal pump. Smaller particles can also accumulate in the region of the rotor mount and significantly reduce its service life.

In order to exclude this condition, the task of the present invention is to provide an electric centrifugal pump in such a way that particle accumulations in the region between the containment shell and the permanent magnet rotor cannot occur or can only occur to a very minor extent and that the consequences of impurities in the wet chamber are reduced in order to prevent premature wear or a blockage of the centrifugal pump.

BRIEF SUMMARY OF THE INVENTION

The invention relates to an electric centrifugal pump with a motor housing, a pump head, a containment shell, and a rotor assembly consisting of a pump impeller and a permanent magnet rotor, whereby the pump head with the containment shell defines a wet chamber, in which the rotor assembly is arranged rotational around a longitudinal motor axis, the containment shell with the motor housing defines a dry chamber, in which a wound stator is arranged, and the permanent magnet rotor is arranged within the stator and a hollow-cylindrical region of the containment shell.

In order to reliably remove small particles which have entered the gap between the rotor and the containment shell, containment shell grooves parallel to the axis and/or parallel to pole gaps are provided, which extend radially into pole gaps of the stator. The depth of the containment shell groove is dimensioned in such a way that the largest particles to be expected can be accommodated therein. When contaminations, such as metal chips or grains of quartz, arrive in the gap region between the rotor and the containment shell, the motor is not immediately blocked but is decelerated as a result of the mass inertia of the rotor. As a result of the rotational momentum, the contaminations search for an escape path and thereby enter into the free space provided by the containment shell grooves. As a result of the frictional forces caused by the rotational movement of the rotor, it is ensured that the foreign body remains in the recess, adheres to other impurity particles or is worn down with time to even smaller particles by the rotational movement of the rotor.

In order to avoid a wedge effect, it is preferable to design the containment shell grooves asymmetrically. In this way, particles can be securely held in the direction of rotation of the permanent magnet rotor if the containment shell grooves are correspondingly designed. Particularly suitable for solving the task are containment shell groove cross sections with undercuts, wherein the width of the containment shell grooves increases with increasing groove depth at least in sections.

An easier transporting away of the dirt particles initially trapped in the containment shell grooves in the direction of rotation of the permanent magnet rotor can be achieved by groove cross sections that change over the groove length of the containment shell grooves. In this respect, it is provided that the cross-sectional area of the groove is smallest in the groove center (in the axial direction) and largest at its ends.

An annular protrusion largely prevents larger particles from arriving at the region between the permanent magnet rotor and the containment shell. Smaller articles can be flushed out of this region again without causing damage. The containment shell grooves can be in the shape of a semicircular disk (semicircular) or have a rectangular, triangular, or trapezoidal cross section.

Since the containment shell grooves only have sufficient space in pole gaps, they must be shaped correspondingly to the shape of the pole gaps, in particular with respect to an angle of inclination or a pitch angle.

When applied to claw pole stators with pitch of the poles engaging with one another, only every second pole gap can accommodate a containment shell groove for manufacturing reasons. Since the pitch angles of adjacent pole gaps are not parallel, the containment shell could otherwise not be taken out of an injection molding tool. Alternatively, a very complex injection molding tool would have to be used.

The depth of the containment shell grooves should be between 0.3 and 1 mm. In this design, most of the particles could be made harmless when using the centrifugal pump as a cooling water pump in the vehicle. It is preferred to design the edges of the containment shell grooves to be sharp-edged. In this way, wedge effects are avoided.

In order to limit the size of particles that arrive in the gap between the permanent magnet rotor and the containment shell in the first place, it is provided that an annular protrusion extends coaxially to the longitudinal motor axis from the pump impeller into a chamber region within the containment shell and the outer diameter of the annular protrusion is smaller than the inner diameter of the containment shell in the region of the protrusion.

In addition to the annular protrusion, a protruding ring collar can extend from the containment shell toward the pump impeller and the outer diameter of the annular protrusion can under all tolerance conditions be slightly smaller than the inner diameter of the protruding ring collar, and the annular protrusion and the protruding annular collar can be arranged concentrically to one another and to the longitudinal motor axis. By means of the protruding ring collar, a defined sealing gap geometry can be achieved, in which the gap distance is consistently small under all tolerance conditions.

Advantageously, the outer diameter of the annular protrusion is selected to be larger than or equal to the outer diameter of the permanent magnet rotor. With a smaller diameter, the radial gap between the annular protrusion and the protruding ring collar would become too large for a sealing effect, because the inner diameter of the protruding ring collar cannot be smaller than the outer diameter of the rotor. In order to not impair hydraulic efficiency, the protruding ring collar of the containment shell is to indeed have a very minor distance from the pump impeller but not touch it.

The permanent magnet rotor is also provided on its outer shell surface with several rotor grooves. The permanent magnet rotor is thereby able to move a portion of the conveyed medium in an annular direction within the gap between the permanent magnet rotor and the containment shell. In order to also bring about an axial component of this forced flow movement of the conveyed medium, a pitch angle of the rotor grooves relative to straight lines parallel to the axis is provided. In this case, the rotor grooves still extend on the outer surface of the permanent magnet rotor.

An optimal distance of the annular protrusion from the protruding ring collar can be achieved by the outer diameter of the annular protrusion being smaller than the inner diameter of the containment shell in the region of the permanent magnet rotor. This results in a minimum friction radius, which has an advantageous effect on the hydraulic efficiency.

The hydraulic resistance is further reduced by a containment shell flange comprising a recess radially outside the protruding ring collar, which recess enlarges the distance to an impeller disk of the pump impeller. A larger distance to the containment shell flange is thereby ensured precisely in the region of larger diameters of the pump impeller in order to reduce the drag torque. For the same reason, the protruding ring collar is designed such that it tapers in the axial direction toward the pump impeller. As a result, the annular surfaces, which are located opposite each other and which bring about the sealing effect with respect to coarse particles, are as small as possible.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

Figure 1:
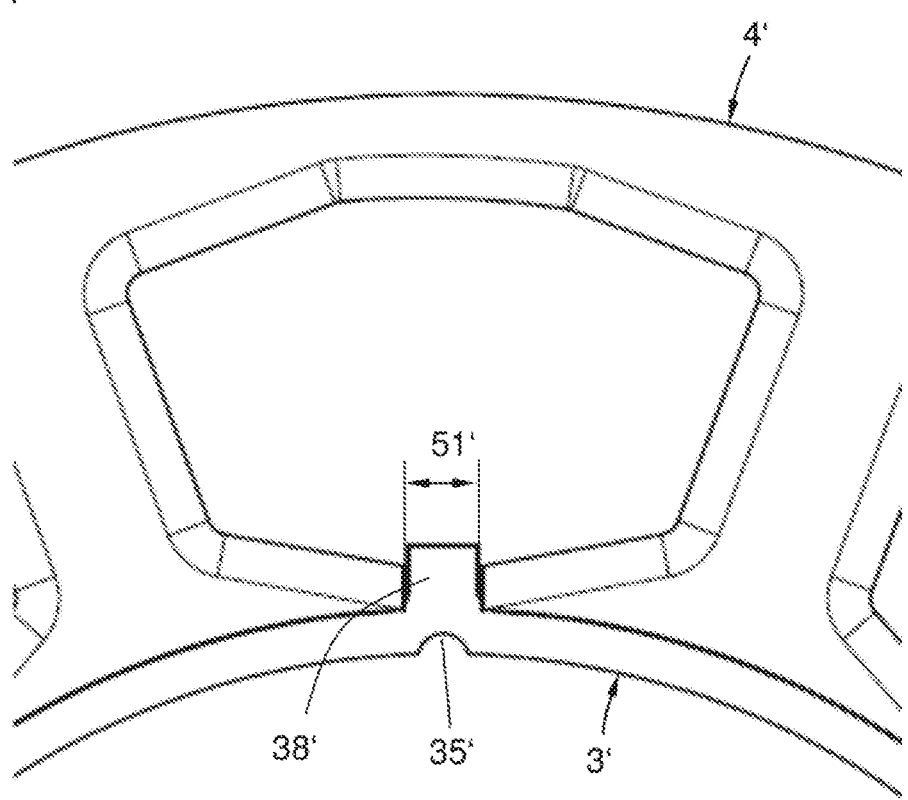
FIG. 1 illustrates a section of a stator with a containment shell with a containment shell groove.

Note: The reference symbols with apostrophe/index and the corresponding reference symbols without apostrophe/index refer to details with the same name in the drawings and the drawing description. This reflects use in another embodiment or the prior art, and/or the detail is a variant. For the sake of simplicity, the claims, the description introduction, the reference symbol list and the abstract contain only reference symbols without apostrophe/index.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a section of a stator 4' with pronounced poles, into which a containment shell 3' is inserted. The containment shell 3' comprises a containment shell groove 35' and a cooling rib 38', which is accommodated in a pole gap 51'. The cooling rib 38' enlarges the surface of the containment shell 3' and therefore improves the heat transfer from the stator winding (not shown) to the conveyed medium within the containment shell 3'. The containment shell groove 35' extends in the region of the pole gap 51' and has in this case a cross section in the shape of a semicircular disk.

Figure 2:
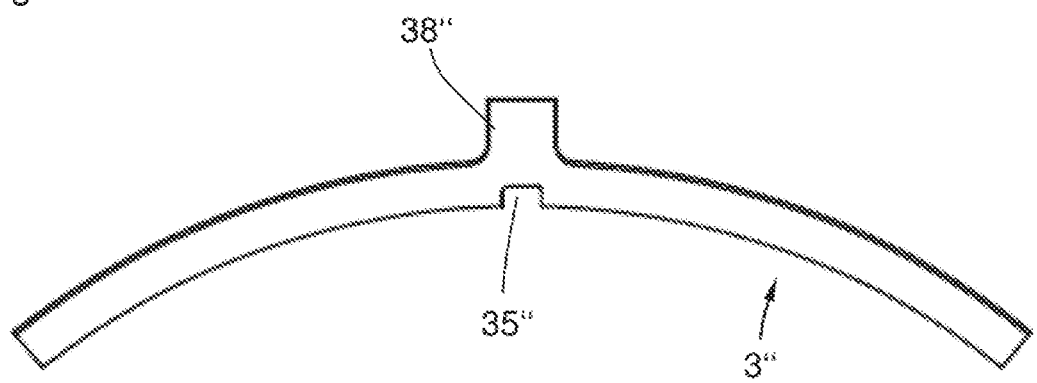
FIG. 2 illustrates a section of a containment shell with a first variant of the containment shell groove.

FIG. 2 shows a section of a containment shell 3" with a first variant of the containment shell groove 35" and the cooling rib 38", where the cross section of the containment shell groove 35" is substantially rectangular.

Figure 3:
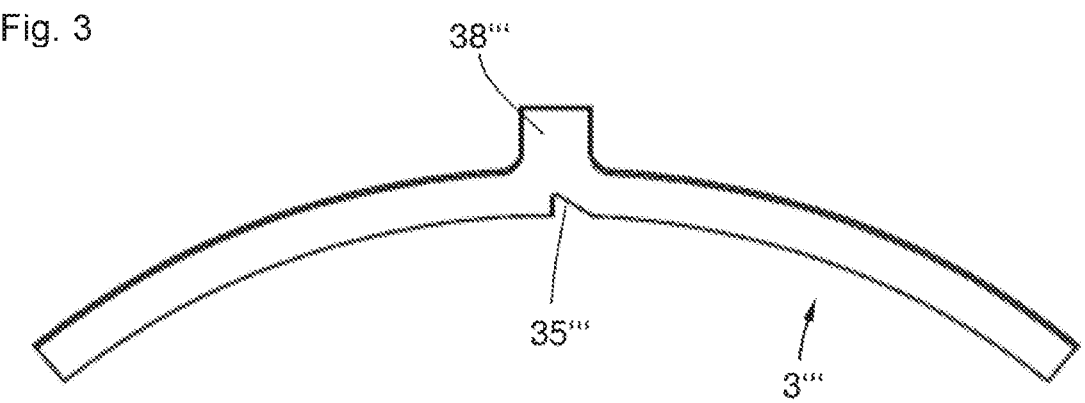
FIG. 3 illustrates a section of a containment shell with a second variant of the containment shell groove.

FIG. 3 shows a section of a containment shell 3'" with a second variant of the containment shell groove 35'" and the cooling rib 38'", where the cross section of the containment shell groove 35'" is substantially triangular. The cross section of the containment shell groove 35'" is thus asymmetrical and largely holds particles in the preferential direction of rotation.

Figure 4:
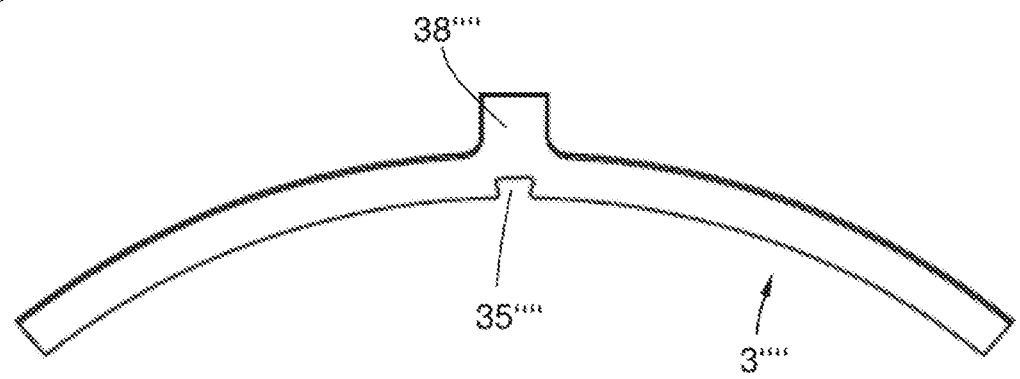
FIG. 4 illustrates a section of a containment shell with a third variant of the containment shell groove.

FIG. 4 shows a section of a containment shell 3"" with a third variant of the containment shell groove 35"" and the cooling rib 38"", where the cross section of the containment shell groove 35"" is substantially trapezoidal with an undercut. In this case, particles are largely held independently of the direction of rotation.

Figure 5:
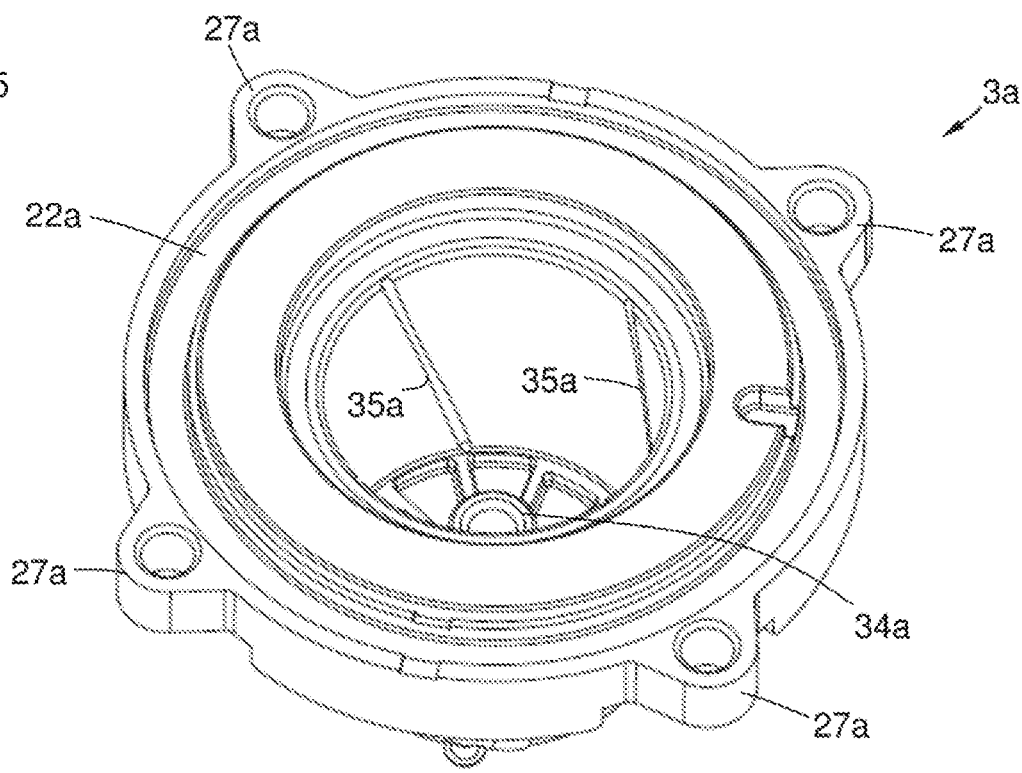
FIG. 5 illustrates a containment shell with pitched containment shell grooves.

FIG. 5 shows a containment shell 3a with pitched containment shell grooves 35a, a containment shell flange 22a, screw holes 27a, and a mount 34a for an axis component. The containment shell grooves 35a have a cross section, the cross-sectional area of which changes in the direction of extent. At a first end of the containment shell groove 35a, the cross-sectional area is smallest and at the other end of the containment shell groove 35a, it is at largest.

Figure 6:
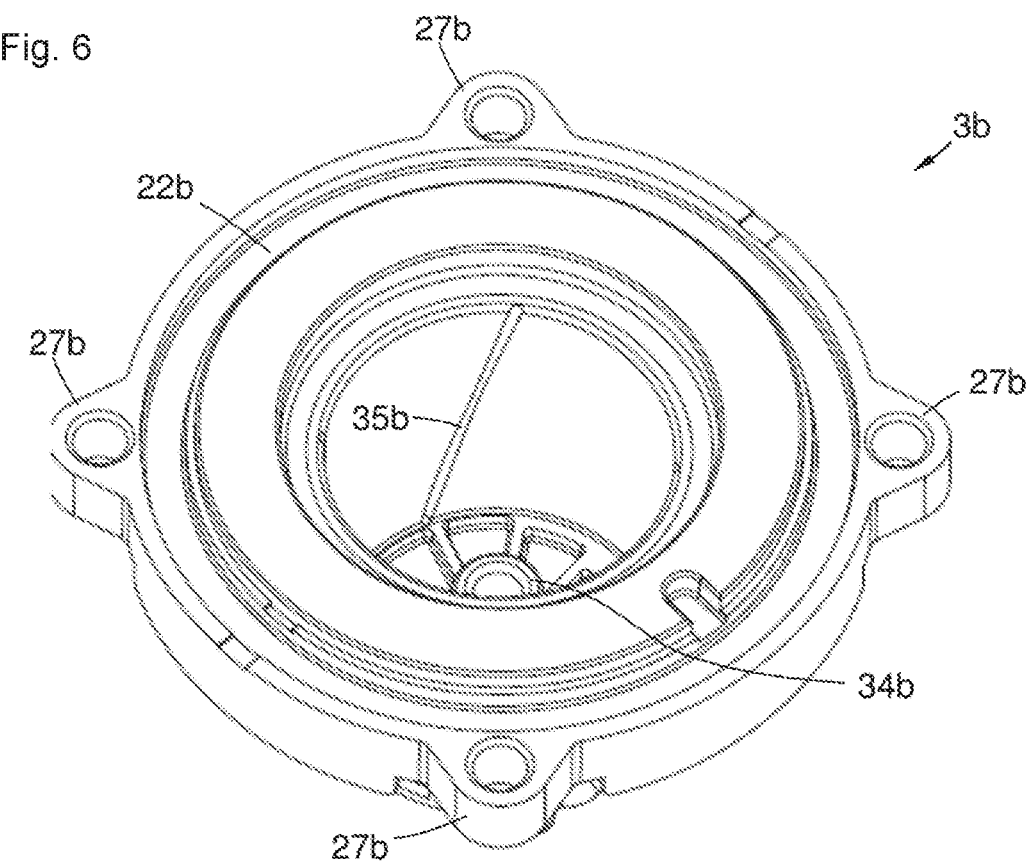
FIG. 6 illustrates a containment shell with a direction of pitch opposite figure

FIG. 6 shows a containment shell 3b with pitched containment shell grooves 35b, a containment shell flange 22b, screw holes 27b, and a mound 34b. The containment shell grooves 35a have a cross section, the cross-sectional area of which changes in the direction of extent. At a first end of the containment shell groove 35a, the cross-sectional area is at smallest and at the other end of the containment shell groove, it is at largest. The direction of pitch is opposite the direction of pitch of FIG. 5.

Figure 7:
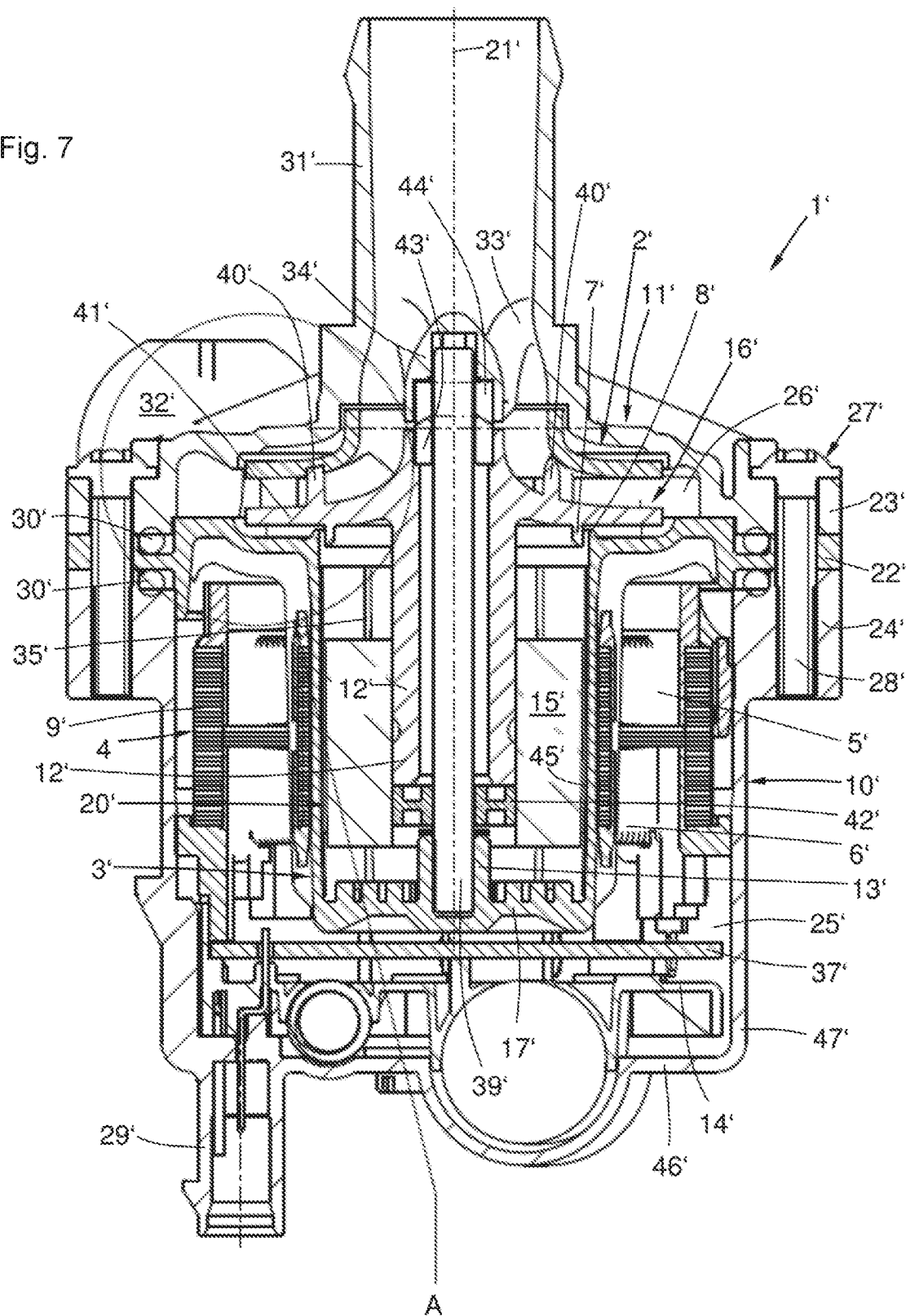
FIG. 7 is a sectional view through a centrifugal pump according to the invention.

FIG. 7 shows a sectional view through an electric centrifugal pump 1' according to the invention, having a motor housing 10', a pump head 11', a containment shell 3', a stator 4', and a rotor assembly 2'. The rotor assembly 2' consists of a permanent magnet rotor 20' and a pump impeller 16'. The pump head 11' and the containment shell 3' constitute the delimitation of a wet chamber 26'. The containment shell 3' and the motor housing 10' constitute the delimitation of a dry chamber 25'. The permanent magnet rotor 20' comprises a permanent magnet 15', a hollow shaft 12', and a fixed bearing 42'. The pump impeller 16' comprises a portion of the hollow shaft 12', an impeller disk 41', pump vanes 40', an annular protrusion 7', a spherical bearing 43', and a cover plate 19' (see FIG. 8).

The rotor assembly 2' is mounted rotationally around a longitudinal motor axis 21' and an axis component 39', which are mounted in an axis mount sleeve 13' as a component of the containment shell 3' and in a mount 34' as a component of the pump head 11'. The spherical bearing 43' can be supported on a spherical counter bearing 44', which is fixed in the mount 34'. The mount 34' is integral with the pump head 11' via spokes 33'; said pump head comprising a suction nozzle 31', a discharge nozzle 32', and a pump head flange 23'. The containment shell 3' comprises a containment shell bottom 17', containment shell grooves 35', a containment shell casing 45', a containment shell flange 22', and a protruding ring collar 8' in the transition region between the containment shell casing 45' and the containment shell flange 22'. The motor housing 10' comprises a housing bottom 46', a connector shaft 29', a housing cover 47', and a housing flange 24'. The containment shell flange 22' is respectively connected to the pump head flange 23' and the housing flange 24' via an O-ring 30'. For mounting, the pump head 11', the containment shell 3', and the motor housing 10' are provided with screw holes 27' and connected to one another via screws 28'. The stator 4', a circuit board 37', and a supporting plate 14' are arranged in the dry chamber 25'. The stator consists of a stator lamination 9', a first insulating element 5', and a second insulating element 6', and a winding (not shown here).

Figure 8:
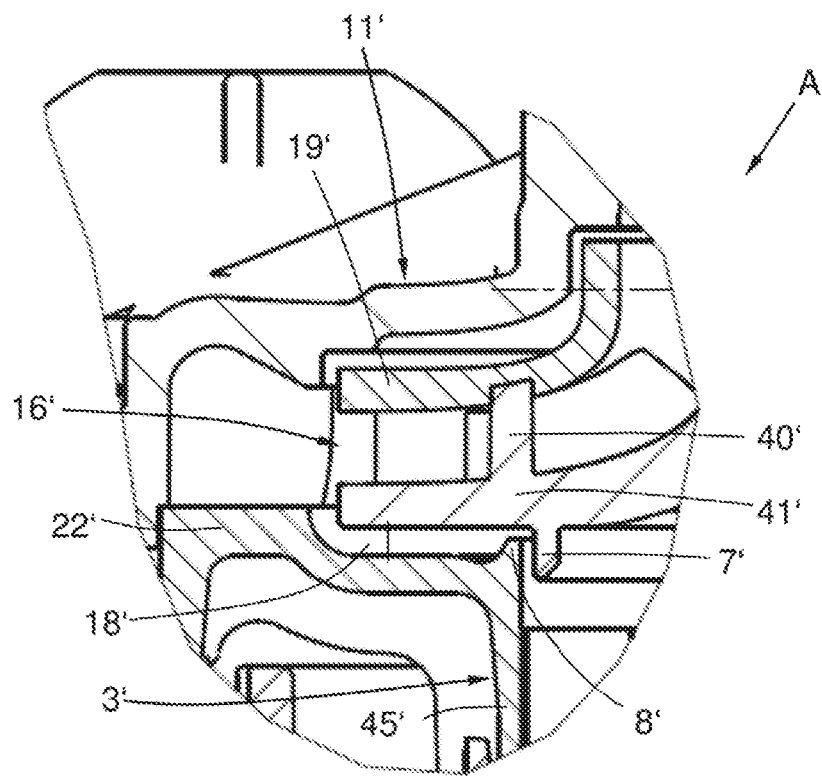
FIG. 8 illustrates an enlarged section A of FIG. 7.

FIG. 8 shows an enlarged section A of FIG. 7 with the pump head 11', the containment shell 3', and the pump impeller 16'. The pump impeller 16' consists of the impeller disk 41', the pump vanes 40', the cover plate 19', and the annular protrusion 7'. The containment shell 3' comprises a containment shell flange 22', a protruding annular collar 8', and a recess 18', which is adjacent to the annular collar 8' and forms a recess for the impeller disk 41'.

Figure 9:
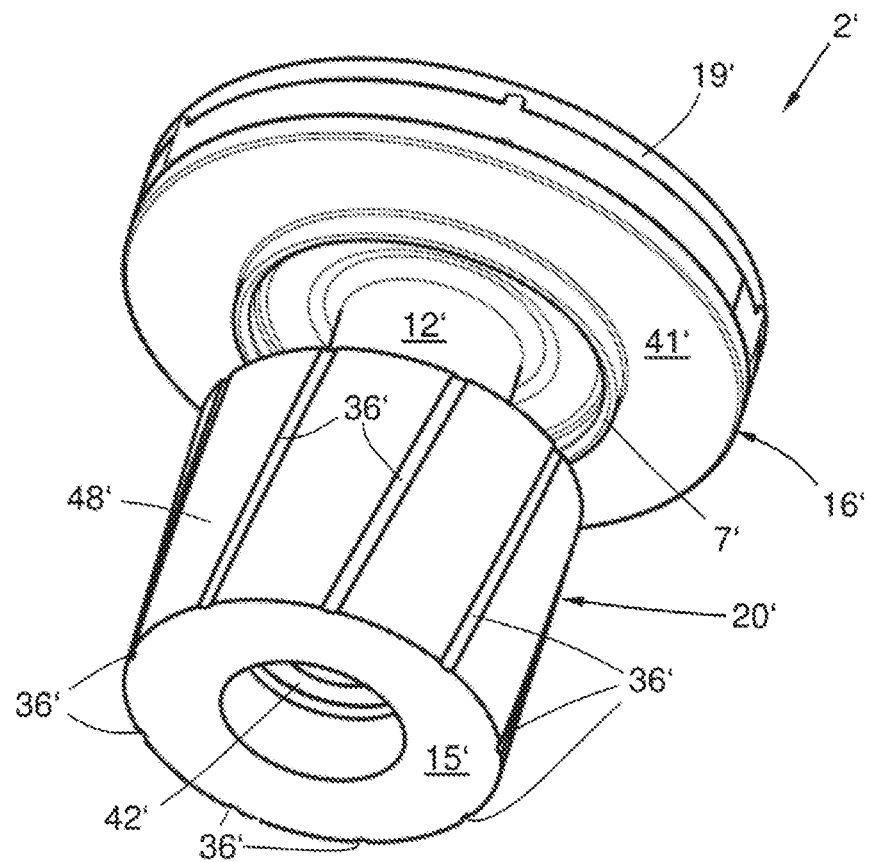
FIG. 9 is a spatial representation of a rotor assembly.

FIG. 9 shows a spatial representation of the rotor assembly 2' consisting of the permanent magnet rotor 20' and the pump impeller 16', with a hollow shaft 12', the permanent magnet 15', the impeller disk 41', the annular protrusion 7', the cover plate 19', and with rotor grooves 36'. The rotor grooves 36' extend in a first approximation parallel to the axis along an outer surface 48' of the permanent magnet rotor 20' but deviate in relation to straight lines parallel to the axis by a small angle. The fixed bearing 42' can be seen inside the permanent magnet 15'.

Figure 10:
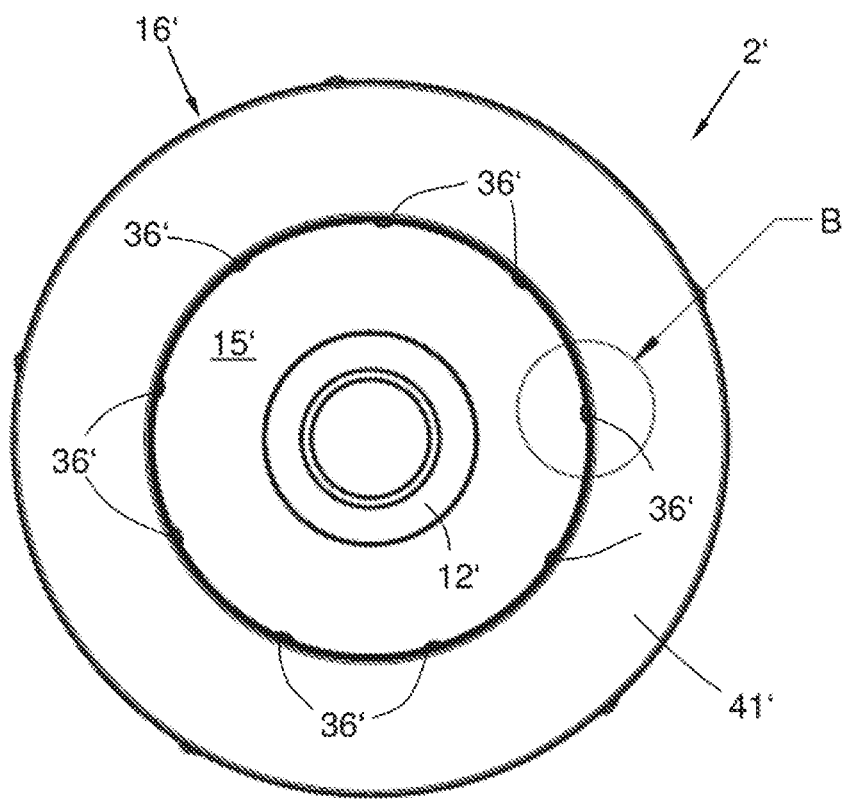
FIG. 10 is a front view of the rotor assembly.

FIG. 10 shows a front view of the rotor assembly 2' with the permanent magnet 15', the hollow shaft 12', the pump impeller 16', and the impeller disk 41'. The rotor grooves 36' in the permanent magnet 15' can be seen at its periphery. In this case, the rotor assembly 2' is shown without fixed bearing.

Figure 11:
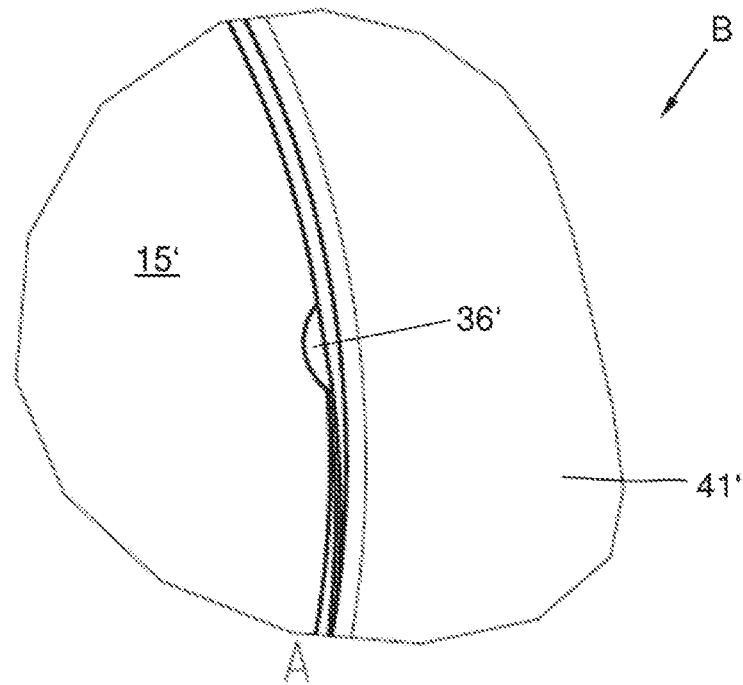
FIG. 11 illustrates an enlarged section A of FIG. 10

FIG. 11 shows an enlarged section B of FIG. 10 with the permanent magnet 15', a rotor groove 36', and the impeller disk 41'. The rotor groove 36' is designed in the shape of a circular segment.

Figure 12:
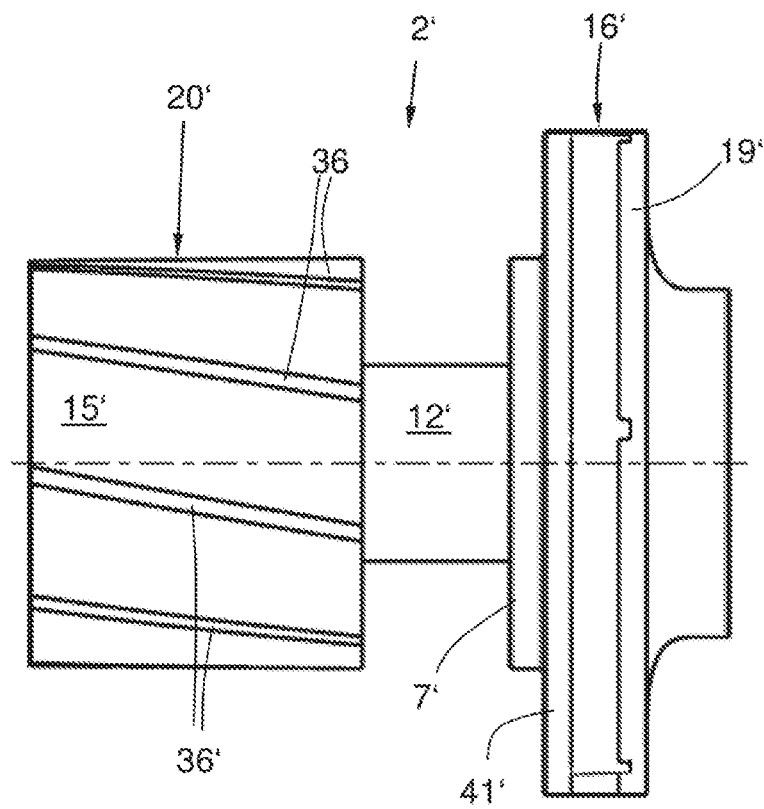
FIG. 12 is a top view of the rotor assembly.

FIG. 12 shows a top view of the rotor assembly 2' with the permanent magnet rotor 20' and the pump impeller 16', which are connected to one another via the hollow shaft 12'. The permanent magnet 15', the rotor grooves 36', the impeller disk 41', the annular protrusion 7', and the cover plate 19' can also be seen.

Figure 13:
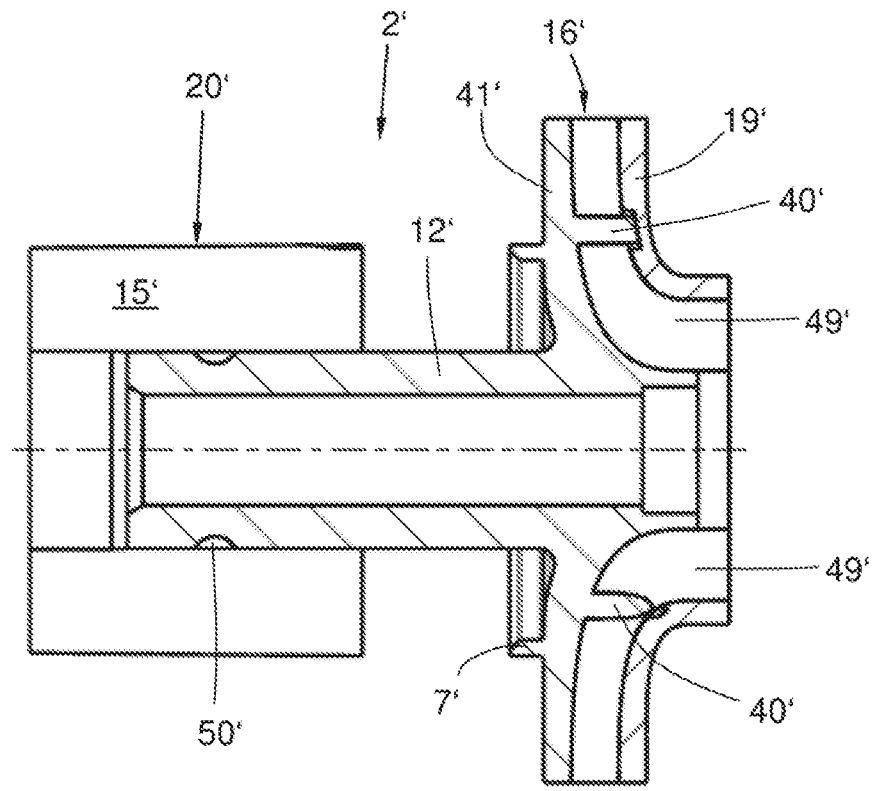
FIG. 13 is a sectional view of the rotor assembly of FIG. 12.

FIG. 13 shows a sectional view of the rotor assembly 2' of FIG. 12, with the permanent magnet rotor 20', the pump impeller 16', the permanent magnet 15', the hollow shaft 12', the impeller disk 41', the annular protrusion 7', the pump vanes 40', and the cover plate 19'. The impeller disk 41', the cover plate 19', and the pump vanes 40' enclose conveyor channels 49', through which the liquid to be conveyed is transported. In the hollow shaft 12', a recessed connecting contour 50' is provided, which allows for a positive connection to the permanent magnet 15'.

Figure 14:
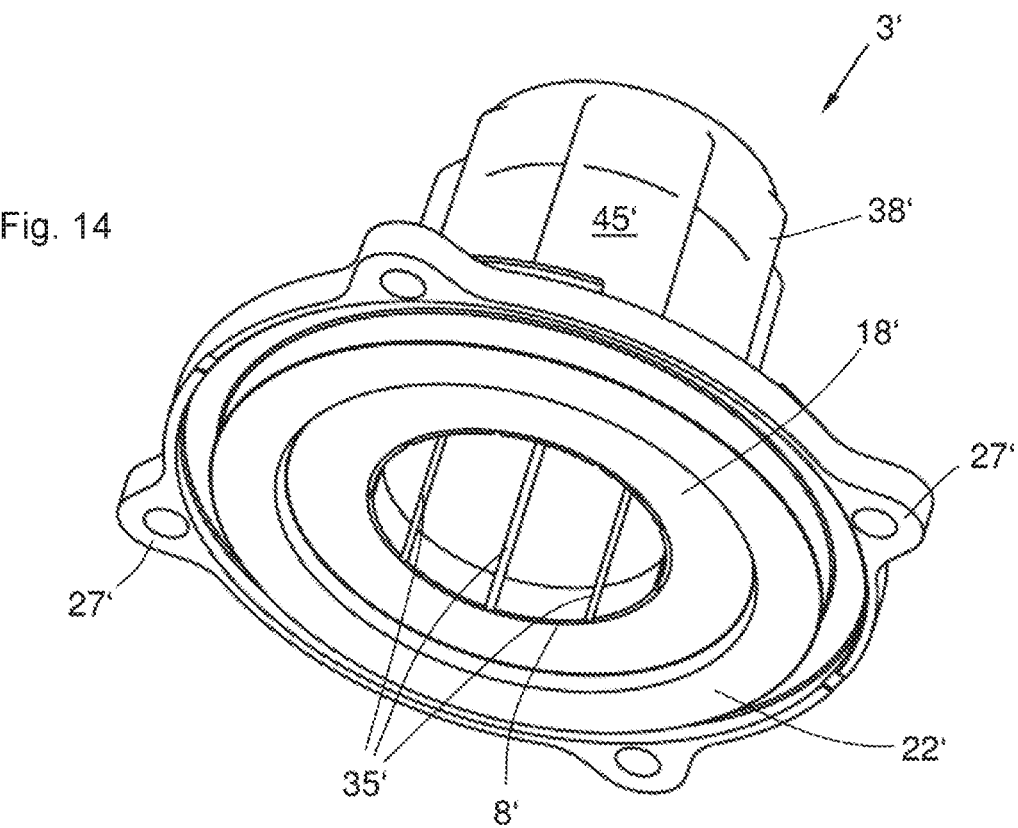
FIG. 14 is a schematic representation of a containment shell.

FIG. 14 shows a spatial representation of the containment shell 3', with the containment shell casing 45', the containment shell flange 22', the mounting holes 27', the protruding ring collar 8', and the recess 18'. Containment shell grooves 35' are present on the inner circumference of the containment shell casing 45' and cooling ribs 38' are present on the outer circumference of the containment shell casing 45'.

Figure 15:
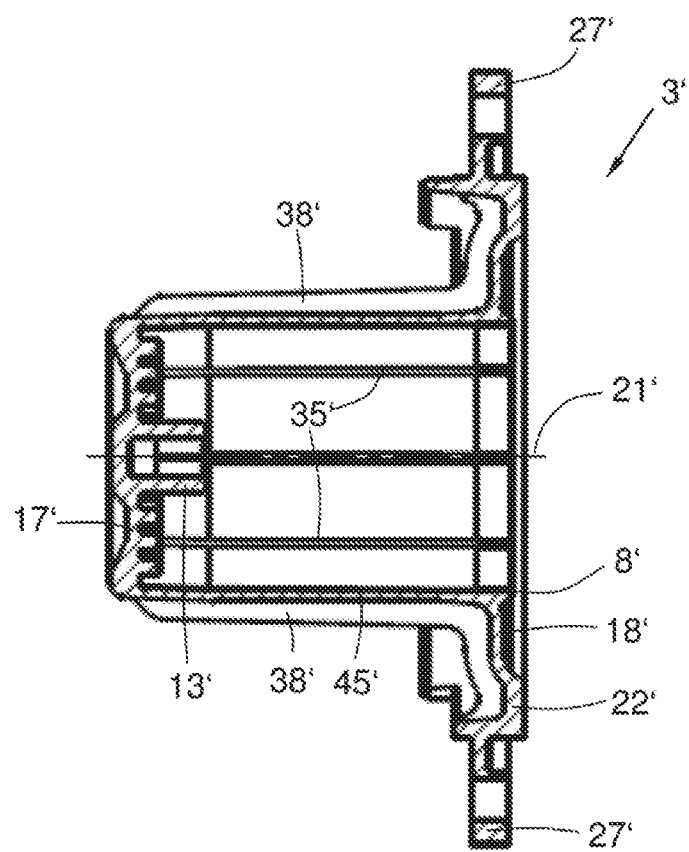
FIG. 15 is a sectional view of the containment shell.

FIG. 15 shows a sectional view of the containment shell 3', with the containment shell casing 45', the containment shell flange 22', the mounting eyes 27', the protruding ring collar 8', the recess 18', the containment shell grooves 35', the cooling ribs 38', the containment shell bottom 17', and the axis mount sleeve 13'. As can be seen in this case, the containment shell grooves 35' are aligned parallel to the longitudinal motor axis 21'.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

| LIST OF REFERENCE SYMBOLS | |
| --- | --- |
| 1 | Centrifugal pump |
| 2 | Rotor assembly |
| 3 | Containment shell |
| 4 | Stator |
| 5 | First insulating element |
| 6 | Second insulating element |
| 7 | Annular protrusion |
| 8 | Protruding ring collar |
| 9 | Stator sheet package |
| 10 | Motor housing |
| 11 | Pump head |
| 12 | Hollow shaft |
| 13 | Axis mounting sleeve |
| 14 | Support plate |
| 15 | Permanent magnet |
| 16 | Pump impeller |

-continued

| LIST OF REFERENCE SYMBOLS | |
|---|---|
| 17 | Containment shell bottom |
| 18 | Recess |
| 19 | Cover plate |
| 20 | Permanent magnet rotor |
| 21 | Longitudinal motor axis |
| 22 | Containment shell flange |
| 23 | Pump head flange |
| 24 | Housing flange |
| 25 | Dry chamber |
| 26 | Wet chamber |
| 27 | Screw hole |
| 28 | Screw |
| 29 | Connector shaft |
| 30 | O-ring |
| 31 | Suction nozzle |
| 32 | Discharge nozzle |
| 33 | Spoke |
| 34 | Mount |
| 35 | Containment shell groove |
| 36 | Rotor groove |
| 37 | Circuit board |
| 38 | Cooling rib |
| 39 | Axis component |
| 40 | Pump vane |
| 41 | Impeller disk |
| 42 | Fixed bearing |
| 43 | Spherical bearing |
| 44 | Spherical counter bearing |
| 45 | Containment shell casing |
| 46 | Housing bottom |
| 47 | Housing cover |
| 48 | Outer surface |
| 49 | Conveyor channel |
| 50 | Connecting contour |
| 51 | Pole gap |
| 52 | Claw pole stator |
| 53 | Claw pole |
| 54 | Winding mounting space |

What is claimed is:

1. An electric centrifugal pump having a longitudinal motor axis, the pump comprising: a motor housing; a pump head; a containment shell having a hollow cylindrical region with an inner circumference; a wet chamber defined by the pump head and the containment shell; a dry chamber defined by the motor housing and the containment shell; a stator with pronounced poles, arranged within the dry chamber, the stator having pole gaps; a rotor assembly comprising a pump impeller and a permanent magnet rotor, the rotor assembly arranged in the wet chamber rotating around the longitudinal motor axis; and the permanent magnet rotor arranged within the stator and the hollow-cylindrical region of the containment shell, wherein the containment shell includes at the inner circumference one or more containment shell grooves, which extend in a straight direction parallel to the longitudinal motor axis, wherein the containment shell further comprises a cooling rib formed on the outer circumference thereof, the cooling rib being aligned along a radial line with the containment shell groove and positioned within a pole gap.

2. The electric centrifugal pump according to claim 1, wherein the containment shell grooves have an asymmetrical depth in cross section.

3. The electric centrifugal pump according to claim 1, wherein the containment shell grooves comprise an undercut so that the width of the groove increases with increasing groove depth at least in sections.

4. The electric centrifugal pump according to claim 1, wherein the containment shell grooves have a cross section that changes over their groove length.

5. The electric centrifugal pump according to claim 1, wherein the cross section of at least one containment shell groove is semicircular.

6. The electric centrifugal pump according to claim 1, wherein the cross section of at least one containment shell groove is rectangular.

7. The electric centrifugal pump according to claim 1, wherein the cross section of at least one containment shell groove is triangular.

8. The electric centrifugal pump according to claim 1, wherein the cross section of at least one containment shell groove is trapezoidal.

9. The electric centrifugal pump according to claim 1, wherein at least one containment shell groove is sharp-edged.

10. The electric centrifugal pump according to claim 1, wherein the depth of at least one containment shell groove is between 0.3 and 1.0 mm.

11. The electric centrifugal pump according to claim 1, further comprising:
an annular protrusion extending coaxially to the longitudinal motor axis from the pump impeller into a chamber region within the containment shell, and an outer diameter of the annular protrusion is smaller than an inner diameter of the containment shell in the region of the protrusion.

12. The electric centrifugal pump according to claim 11, further comprising a protruding ring collar extending from the containment shell towards the pump impeller,
wherein the outer diameter of the annular protrusion is slightly smaller than the inner diameter of the protruding ring collar, and
wherein the annular protrusion and the protruding ring collar are arranged concentrically to one another and to the longitudinal motor axis.

13. The electric centrifugal pump according to claim 12, wherein the protruding ring collar of the containment shell is at a very small distance from the pump impeller but does not touch the pump impeller.

14. The electric centrifugal pump according to claim 11, wherein the permanent magnet rotor has an outer diameter and the outer diameter of the annular protrusion is larger than or equal to the outer diameter of the permanent magnet rotor.

15. The electric centrifugal pump according to claim 11, wherein the outer diameter of the annular protrusion is smaller than the inner diameter of the containment shell in the region of the permanent magnet rotor.

16. The electric centrifugal pump according to claim 1, wherein the permanent magnet rotor has an outer surface that includes several rotor grooves.

17. The electric centrifugal pump according to claim 16, wherein the rotor grooves extend parallel to the longitudinal motor axis on the outer surface of the permanent magnet rotor.

18. The electric centrifugal pump according to claim 1, further comprising a containment shell flange integral with the containment shell and having a recess radially outside a protruding ring collar, which enlarges a recess distance to an impeller disk of the pump impeller.

19. The electric centrifugal pump according to claim 18, wherein the protruding ring collar tapers in the axial direction towards the pump impeller.

20. An electric centrifugal pump having a longitudinal motor axis, the pump comprising: a motor housing; a pump head; a containment shell having a hollow cylindrical region with an inner circumference; a wet chamber defined by the pump head and the containment shell; a dry chamber defined by the motor housing and the containment shell; a stator with pronounced poles, arranged within the dry chamber, the stator having pole gaps; a rotor assembly comprising a pump impeller and a permanent magnet rotor, the rotor assembly arranged in the wet chamber rotating around the longitudinal motor axis; and the permanent magnet rotor arranged within the stator and the hollow-cylindrical region of the containment shell, wherein the containment shell includes at the inner circumference one or more containment shell grooves, and wherein the containment shell grooves have an asymmetrical depth in cross section, wherein the containment shell further comprises a cooling rib formed on the outer circumference thereof, the cooling rib being aligned along a radial line with the containment shell groove and positioned within a pole gap.

* * * * *